US012567222B2

(12) United States Patent
Kumar et al.

(10) Patent No.: US 12,567,222 B2
(45) Date of Patent: Mar. 3, 2026

(54) GENERATIVE MULTI-LAYERED IMAGE RENDERING BASED ON DATA PROMPTS

(71) Applicant: Boom Interactive, Inc., Sandy, UT (US)

(72) Inventors: Vinay Kumar, Charlotte, NC (US); Jeremiah Timberline Barker, Sandy, UT (US)

(73) Assignee: Boom Interactive, Inc., Sandy, UT (US)

( * ) Notice: Subject to any disclaimer, the term of this patent is extended or adjusted under 35 U.S.C. 154(b) by 200 days.

(21) Appl. No.: 18/440,667

(22) Filed: Feb. 13, 2024

(65) Prior Publication Data

US 2025/0259406 A1 Aug. 14, 2025

(51) Int. Cl.
| | |
|---|---|
| *G06T 19/00* | (2011.01) |
| *G06T 7/13* | (2017.01) |
| *G06T 7/181* | (2017.01) |
| *G06T 19/20* | (2011.01) |

(52) U.S. Cl.
CPC ............... *G06T 19/20* (2013.01); *G06T 7/13* (2017.01); *G06T 7/181* (2017.01); *G06T 2200/24* (2013.01); *G06T 2207/20081* (2013.01); *G06T 2207/20084* (2013.01); *G06T 2210/04* (2013.01)

(58) Field of Classification Search
None
See application file for complete search history.

(56) References Cited

U.S. PATENT DOCUMENTS

| 8,773,435 | B2 * | 7/2014 | Falco, Jr. ................ G06T 15/00 |
| | | | 345/428 |
| 11,450,046 | B1 * | 9/2022 | Diks .................... G06Q 20/065 |
| 11,978,273 | B1 * | 5/2024 | Ramaswamy ......... G06N 3/045 |
| 2013/0076730 | A1 * | 3/2013 | Rolleston ........... H04N 1/00896 |
| | | | 345/419 |
| 2019/0095985 | A1 * | 3/2019 | Wang ................. G06Q 30/0643 |
| 2019/0385351 | A1 * | 12/2019 | Luo ........................ G06T 19/006 |
| 2020/0257762 | A1 * | 8/2020 | Eskamani ................ G06N 3/09 |
| 2021/0327127 | A1 * | 10/2021 | Hinterstoisser ......... G06T 19/20 |
| 2022/0139352 | A1 * | 5/2022 | Hu ........................... G06T 11/60 |
| | | | 345/204 |
| 2023/0073843 | A1 * | 3/2023 | Sampaio De Rezende ................. |
| | | | G06F 16/532 |
| 2023/0128288 | A1 * | 4/2023 | Lansel .................. G06T 3/4007 |
| | | | 345/629 |
| 2023/0199136 | A1 * | 6/2023 | Lee ...................... G06V 10/761 |
| | | | 345/629 |

(Continued)

*Primary Examiner* — Martin Mushambo

(74) *Attorney, Agent, or Firm* — TechLaw Ventures, PLLC; Terrence J. Edwards

(57) ABSTRACT

Systems, methods, and devices for generative rendering based on user-initiated prompts. A method includes determining a base rendering of a space and generating a layer within the base rendering, wherein the layer is associated with an identified region within the base rendering. The method includes receiving a layer amendment request comprising instructions for amending the identified region associated with the layer, wherein the layer amendment request comprises one or more of a text prompt or an image prompt. The method includes providing the layer amendment request to an artificial intelligence and/or machine learning (AI/ML) engine configured to generatively render the identified region based on the layer amendment request.

20 Claims, 11 Drawing Sheets

(56) References Cited

U.S. PATENT DOCUMENTS

| 2023/0222727 | A1* | 7/2023 | Yoo | G06T 5/77 |
| | | | | 345/419 |
| 2023/0343011 | A1* | 10/2023 | Kelly | G06T 13/40 |
| 2023/0377324 | A1* | 11/2023 | Kim | G06V 10/82 |
| 2024/0249446 | A1* | 7/2024 | Atzmon | G06T 11/00 |

* cited by examiner

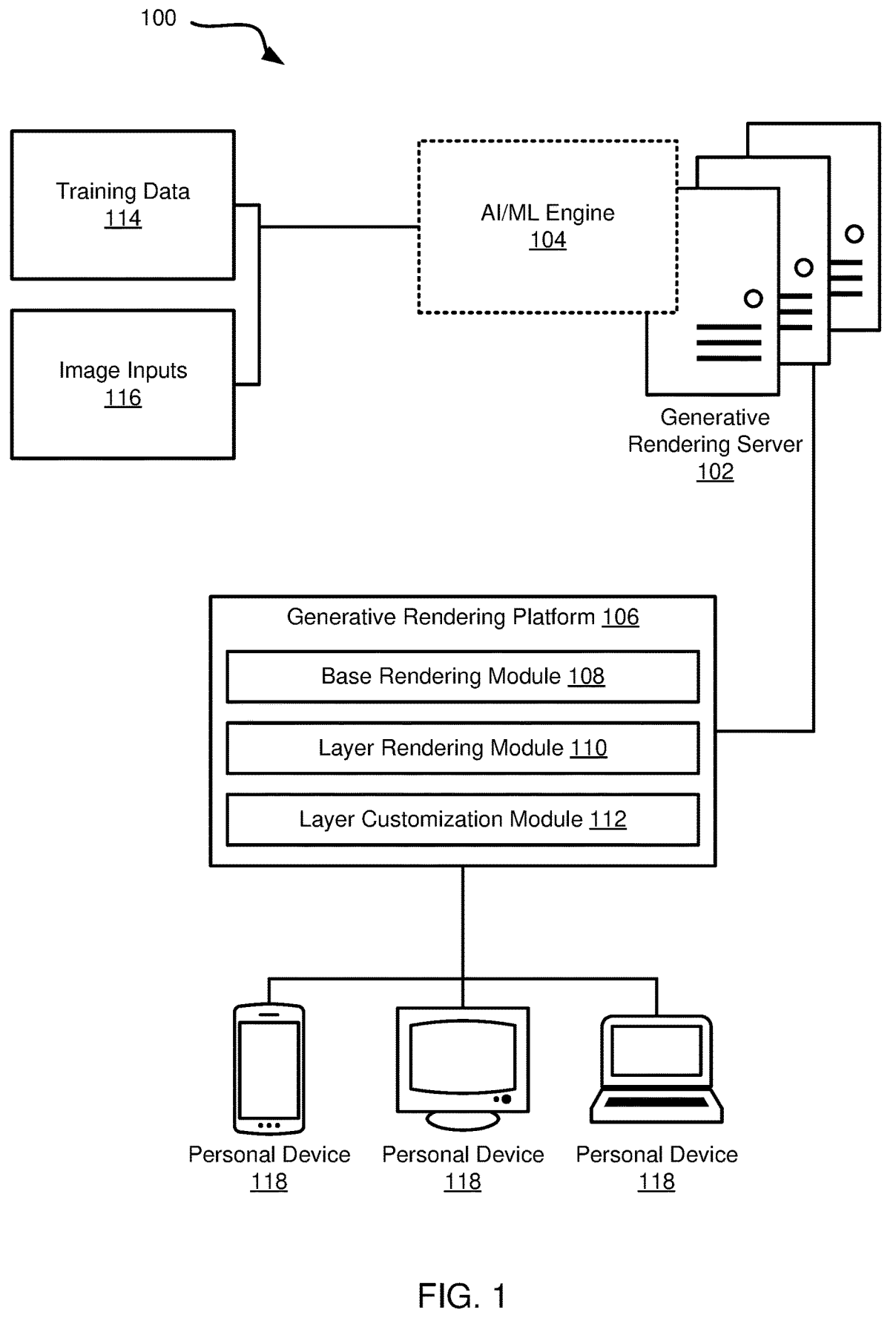

100

Training Data
114

Image Inputs
116

AI/ML Engine
104

Generative
Rendering Server
102

Generative Rendering Platform 106

Base Rendering Module 108

Layer Rendering Module 110

Layer Customization Module 112

Personal Device
118

Personal Device
118

Personal Device
118

FIG. 1

GENERATIVE MULTI-LAYERED IMAGE RENDERING BASED ON DATA PROMPTS

TECHNICAL FIELD

The present disclosure relates to generative image rendering and particularly relates to generating a customized multi-layered image.

BACKGROUND

Residential and commercial construction and remodeling projects can be extraordinarily complex. A relatively simple residential remodeling project, for example, can require multiple parties to make numerous decisions regarding floorplans, constructions materials, design materials, furnishings, and so forth. It is challenging to visualize how different construction and design materials will look together in a specific space. Further, and particularly for new-build construction or extensive remodeling, it can be challenging to visualize how a floorplan or design scheme will look and feel.

Construction and design rendering programs currently known in the art are difficult to use and primarily directed for use by professionals who are trained to use a specific program. Additionally, these construction and design rendering programs can be extraordinarily expensive and are cost-prohibitive for average consumers. There is a need for a simple-to-use design rendering program that enables users to separately customize various aspects of a design. Such a program would be useful for numerous entities in the construction and remodeling industries and would enable consumers to visualize a space with specific construction materials prior to beginning construction.

In light of the foregoing, disclosed herein are systems, methods, and devices for improved design rendering programs. Specifically disclosed herein are systems, methods, and devices for generative multi-layered image rendering.

BRIEF DESCRIPTION OF THE DRAWINGS

Non-limiting and non-exhaustive implementations of the present disclosure are described with reference to the following figures, wherein like reference numerals refer to like or similar parts throughout the various views unless otherwise specified. Advantages of the present disclosure will become better understood with regard to the following description and accompanying drawings where:

FIG. 1 is a schematic diagram of a design rendering system comprising a rendering platform operated by a rendering server in communication with a network;

DETAILED DESCRIPTION

Figure 2:
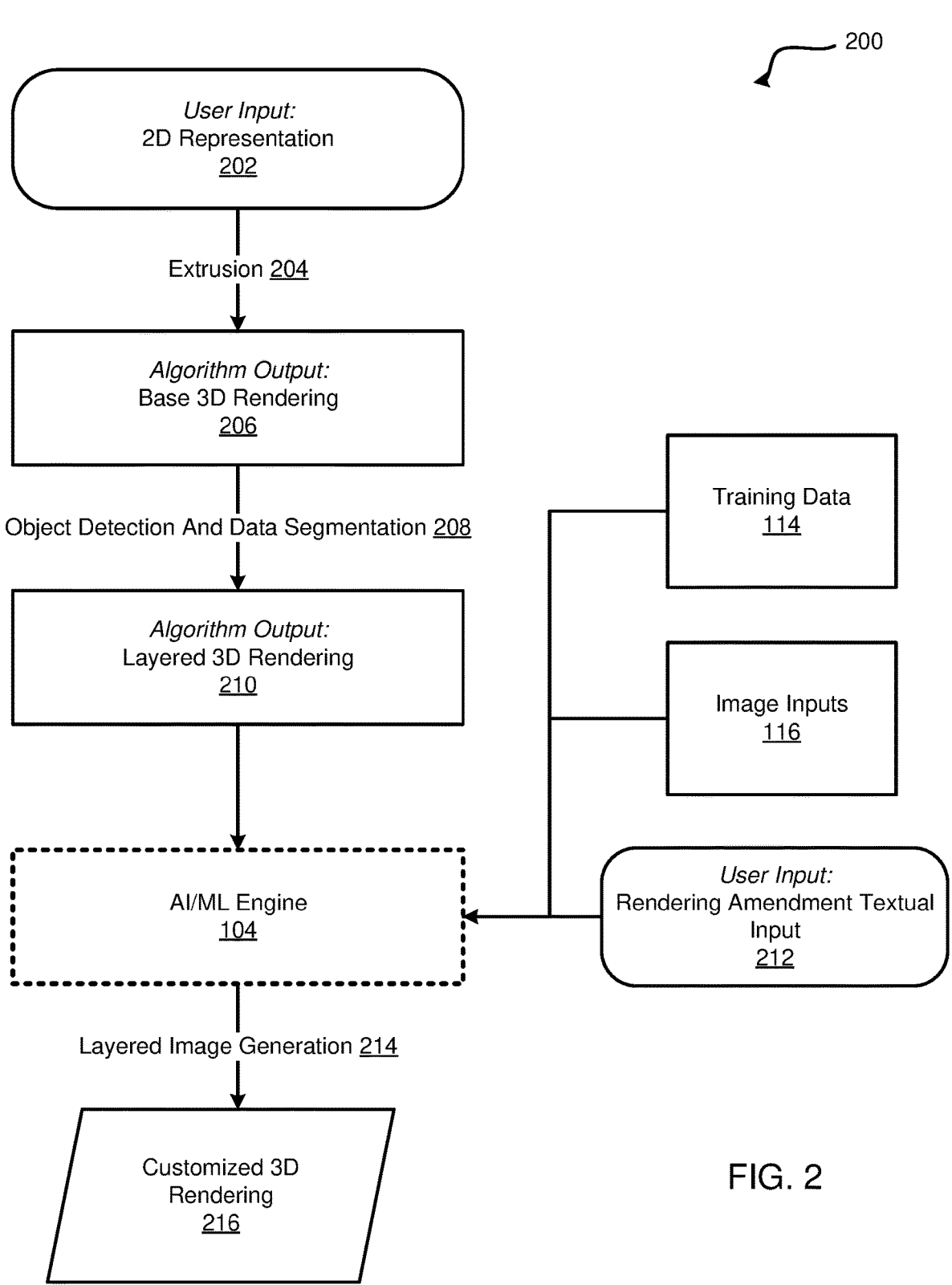
FIG. 2 is a schematic block diagram illustrating a process flow for generating a customized multi-layered rendering of a space.

Disclosed herein are systems, methods, and devices for generating and rendering customized images that include numerous layers. The systems, methods, and devices described herein provide improved customizability when compared with traditional generative rendering models. The systems, methods, and devices described herein enable users to generate a design rendering quickly and easily, and then customize various aspects of the design rendering.

The systems, methods, and devices described herein may be implemented to generate a rendering of an indoor or outdoor space. In an example implementation, the generative artificial intelligence and/or machine learning (AI/ML) model described herein is utilized to generate a customized rendering of an interior design. The customized rendering could be applied to any space, such as a kitchen, living room, commercial workspace, community gathering area, and so forth. The customized rendering includes numerous layers to enable a user to adjust specific elements of the design. These layers could be applied to, for example, the flooring selection, lighting selections, furniture selections, paint selections, cabinetry selections, and so forth. The user may quickly and easily adjust the customized rendering by providing updated text inputs to the AI/ML model.

Developments in generative artificial intelligence for image rendering enable users to provide a text prompt, and then instruct an AI/ML engine to generate an image based on the text prompt. Generative artificial intelligence for image rendering involves using artificial intelligence techniques, particularly generative models, to create realistic and novel images. The generative models are trained on large datasets of images and can generate new images that share characteristics with the training data. Popular generative artificial intelligence models include generative adversarial networks (GANs), variational autoencoders (VAEs), conditional GANs, transformative models, style transfer models, super-resolution models, and data augmentation models. The systems, methods, and devices described herein leverage generative artificial intelligence models to generate multi-layered three-dimensional renderings of interior or exterior spaces.

Before the methods, systems, and devices of the present disclosure are described, it is to be understood that this disclosure is not limited to the configurations, process steps, and materials disclosed herein as such configurations, process steps, and materials may vary somewhat. It is also to be understood that the terminology employed herein is used for describing implementations only and is not intended to be limiting since the scope of the disclosure will be limited only by the appended claims and equivalents thereof.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

A detailed description of systems, methods, and devices consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description to provide a thorough understanding of the embodiments disclosed herein, some embodiments may be practiced without some or all these details. Moreover, for clarity, certain technical material that is known in the related art has not been described in detail to avoid unnecessarily obscuring the disclosure.

Referring now to the figures, FIG. 1 is a schematic diagram of a system 100 for image rendering and visualization. The system 100 includes a generative rendering server 102 that includes an artificial intelligence and/or machine learning (AI/ML) engine 104. The AI/ML engine 104 receives at least training data 114 and image inputs 116. The generative rendering server 102 processes operations for a generative rendering platform 106 that is made accessible to users by way of personal devices 118. The generative rendering platform 106 includes numerous modules, and may at least include a base rendering module 108, layer rendering module 110, and layer customization module 112.

The system 100 is an end-to-end solution to render high-fidelity realistic renders of an indoor or outdoor space. The system 100 is capable of interpreting input data from various modalities to accurately generate customized renderings. The AI/ML engine 104 includes a multimodal deep learning module that interprets input data learned concurrently.

The AI/ML engine 104 includes one or more neural networks configured for different tasks and trained with different datasets. The AI/ML engine 104 may comprise one or more of a radial basis forward (RBF) network, a deep feed forward (DFF) network, a recurrent neural network (RNN), a long/short term memory (LTSM) network, a gated recurrent unit (GRU) network, an autoencoder (AE) network, a variational autoencoder (VAE) network, a denoising autoencoder (DAE) network, a sparse autoencoder (SAE) network, a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a support vector machine (SVM), a neural Turing machine (NTM), and so forth. The type of neural network deployed by the AI/ML engine 104 may be selected based on the type of task to be executed by the AI/ML engine 104. Any suitable neural network may be used depending on the type of task to be executed and the efficiency of the neural network in executing that task.

The training data 114 for the AI/ML engine 104 is utilized to teach the AI/ML engine 104 to perform specific tasks, including at least generating a rendering of a space, identifying objects and regions within the rendering, and generating layer-specific updates to the rendering. The training data 114 serves as the foundation upon which the AI/ML engine 104 learns patterns, makes decisions, and generates predictions. The training data 114 includes structured and unstructured data from various sources, which may include text, images, audio, and sensor data. The quality of the training data 114 is assessed to reduce or eliminate bias and errors in the data. In most cases, data cleaning and data preprocessing is necessary to ensure the quality of the training data 114.

The image inputs 116 for the AI/ML engine 104 are utilized alongside the training data 114. In some cases, the image inputs 116 are pulled by the AI/ML engine 104 through an Internet search. The AI/ML engine 104 may retrieve image data inputs for certain type of fixtures that may be included within a rendering.

In a specific implementation, the AI/ML engine 104 is utilized to generate a rendering of an interior design. In this implementation, the training data 114 and image inputs 116 include images with metadata labels. The images in the training data 114 and image inputs 116 would include depictions of interior design elements, including, for example, flooring, lighting, furniture, wall coverings, window coverings, cabinetry, countertops, bathroom fixtures, appliances, and so forth. The AI/ML engine 104 could further be utilized to generate a rendering of an exterior design. In this case, the training data 114 and image inputs 116 includes images with metadata labels, and the images would include depictions of exterior design elements, including, for example, building exteriors, outdoor fixtures, recreational fixtures, swimming pools and associated fixtures, ground coverings, plants, animal habitats, and so forth.

In some cases, the training data 114 includes a snapshot of a three-dimensional view of a space from a given camera angle. The training data 114 may further include a combination of text prompts for various layers within the three-dimensional rendering of the space. The training data 114 may additionally include prompt images added for each layer within the three-dimensional rendering to extract features for the respective layers. The training data 114 may additionally include the coordinates, orientations, and characteristics of the virtual camera from a fixed angle. The training data 114 may additionally include an original two-dimensional floorplan image along with and associated segmentation mask for the region being rendered by the AI/ML engine 104.

The base rendering module 108 executed by the generative rendering server 102 is configured to generate a base-level rendering of a space. The rendering may include a two-dimensional or three-dimensional rendering. The space could include an interior space, such as a kitchen, living room, bedroom, bathroom, office, commercial space, retail space, warehouse, and so forth. The space could include an exterior space, such as a park, backyard, front yard, recreational space, roadway, amphitheater, and so forth. The amount of detail within the base-level rendering of the space will depend on the type of space. For example, a base-level rendering of a kitchen may include a basic cabinetry layout and configuration but will not include design details such as flooring or tiling selections. Further for example, a base-level rendering of a backyard may include relative dimensions and existing structures but will not include design details such as planned structures, planned plant life, and so forth.

The base rendering module 108 is capable of receiving a two-dimensional drawing of a space and then converting the two-dimensional drawing into a three-dimensional rendering. The AI/ML engine 104 of the generative rendering server 102 converts an input two-dimensional drawing into a geometric vector diagram. The AI/ML engine 104 utilizes the geometric vector diagram to generate an interactive three-dimensional rendering of the objects illustrated in the input two-dimensional drawing. In an embodiment, the input two-dimensional drawing illustrates the floorplan of a residential or commercial construction project, a residential or commercial remodeling project, a landscaping construction project, and/or a landscaping remodeling project. The input two-dimensional drawing may be a computer-generated line drawing that follow traditional blueprint conventions for a construction or remodeling project. The input two-dimensional drawing may be a computer-generated line drawing that does not follow traditional blueprint conventions, and may alternatively be a hand-drawn floorplan, a photograph taken of a printed computer-generated or hand-drawn floorplan, and so forth. The AI/ML engine 104 analyzes and assess the input two-dimensional drawing and generates serialized data comprising a vector diagram equivalent to the floorplan illustrated in the input two-dimensional drawing. The vector diagram can be used to generate an interactive, customizable, three-dimensional rendering of the floorplan illustrated in the input two-dimensional drawing.

The layer rendering module 110 executed by the generative rendering server 102 identifies and classifies regions within the base rendering. Each of these regions is extracted as a layer within the base rendering, and each layer may then be further customized and fine-tuned based on the user's requests input to the AI/ML engine 104.

The quantity and types of layers will depend on the scene being rendered. For example, a rendering of a kitchen may include a separate layer for each appliance, a layer for wall color, a layer for cabinetry color, a layer for cabinetry design, a layer for flooring selection, a layer for window covering design, a layer for countertop selection, a layer for tiling selection, and so forth. A user may submit individual requests to the AI/ML engine 104 to customize and adjust the rendering for each layer. Each of these requests may be individually processed by the AI/ML engine 104 to provide a highly customized final rendering.

The layer customization module 112 executed by the generative rendering server 102 receives the user's customization requests for each layer and then inputs the requests into the customized final rendering. The layer customization module 112 applies colors, textures, constructions materials, design materials, user-defined preferences, and so forth to the layers identified in the base rendering of a space.

The AI/ML engine 104 executes the layer customization module 112 by generatively rendering individual layers within the base rendering. Further to the above example, wherein the user submits customization requests for layers within a kitchen rendering, the layer customization module 112 is configured to render a specific cabinetry design, cabinetry color, wall covering design, flooring selection, countertop selection, appliance selection, and so forth, based on user input. The customized final rendering will include a three-dimensional or two-dimensional rendering of the kitchen featuring the user's flooring, cabinetry, tiling, countertop, appliance, etc. selections.

The personal device 114 is any personal computing device that can communicate with the generative rendering server 102. The personal device 114 may include a smart phone, a tablet, a laptop, a personal computer, virtual or augmented reality device, and so forth. The personal devices 114 may communicate with the generative rendering server 102 by way of a local area network (LAN) connection, a wide area network (WAN) connection, or another network connection.

FIG. 2 is a schematic block diagram of a process flow 200 for generating a customized rendering of a space. The process flow 200 is executed by the generative rendering server 102, and components of the process flow 200 are executed by the AI/ML engine 104. The process flow 200 represents an end-to-end pipeline that consumes data inputs and generates embedding representations that are used to generate a customized and multi-layered three-dimensional rendering of a space.

The process flow 200 begins with a user input including a two-dimensional representation 202 of a space. The two-dimensional representation 202 may include a blueprint, computer-rendered line drawing, hand drawn line drawing, and so forth. The process flow 200 includes an extrusion 204 algorithm executed on the 2D representation 202 to generate a base three-dimensional rendering 206. The base 3D rendering 206 has limited customizations.

The process flow 200 continues and includes an object detection and data segmentation 208 algorithm executed on the base 3D rendering 206. The object detection and data segmentation 208 algorithm includes identifying regions or "layers" within the base 3D rendering 206. In an example implementation wherein the base 3D rendering 206 represents a kitchen design, the object detection, and data segmentation 208 algorithm includes identifying, for example, the cabinetry, the appliances, the flooring, the walls, the windows, the countertops, and so forth, within the base 3D rendering 206. Each of these identified objects or regions may be classified as a layer within the base 3D rendering 206. The output of the object detection and data segmentation 208 algorithm is a layered 3D rendering 210, wherein each of the identified objects/regions within the base 3D rendering are segmented into individual layers.

The layered 3D rendering 210 is provided to the AI/ML engine 104 along with the training data 114, the image inputs 116, and a user input that comprises a text prompt 212. The text prompt 212 includes a user request to amend or adjust a layer within the layered 3D rendering 210. Further to the above example, the text prompt 212 could include a request to customize the flooring layer to feature grey tile in a herringbone pattern. Further for example, the text prompt 212 could include a request to customize the cabinetry to feature shaker cabinet fronts painted a certain color.

The process flow 200 continues and the AI/ML engine 104 performs layered image generation 214 to customize layers within the layered 3D rendering 210 based on user input. The AI/ML engine 104 generatively renders specific designs for the various layers to generate the customized 3D rendering 216. The customized 3D rendering 216 may have customized renderings for each layer within the layered 3D rendering 210. Further to the above example, the customized 3D rendering 216 may have customized selections for the backsplash tiling, countertop design, flooring selection, wall covering selection, cabinetry selection, lighting selection, appliance selection, and so forth.

In an implementation, the AI/ML engine 104 is trained to execute the process flow 200 through a specialized and fine-tuned training process performed on one or more open-source subsystems such as large language model meta-AI (LLaMA) or segment anything model (SAM). The training data 114 is curated and fine-tuned to include applicable text inputs, metadata inputs, and image inputs applicable to generating the customized multi-layered 3D rendering. The AI/ML engine 104 relies on a specialized data preprocessing pipeline to clean, extract, and feed data to corresponding blocks within the AI/ML engine 104. The data preprocessing pipeline is discussed in further detail in FIG. 3.

Figure 3:
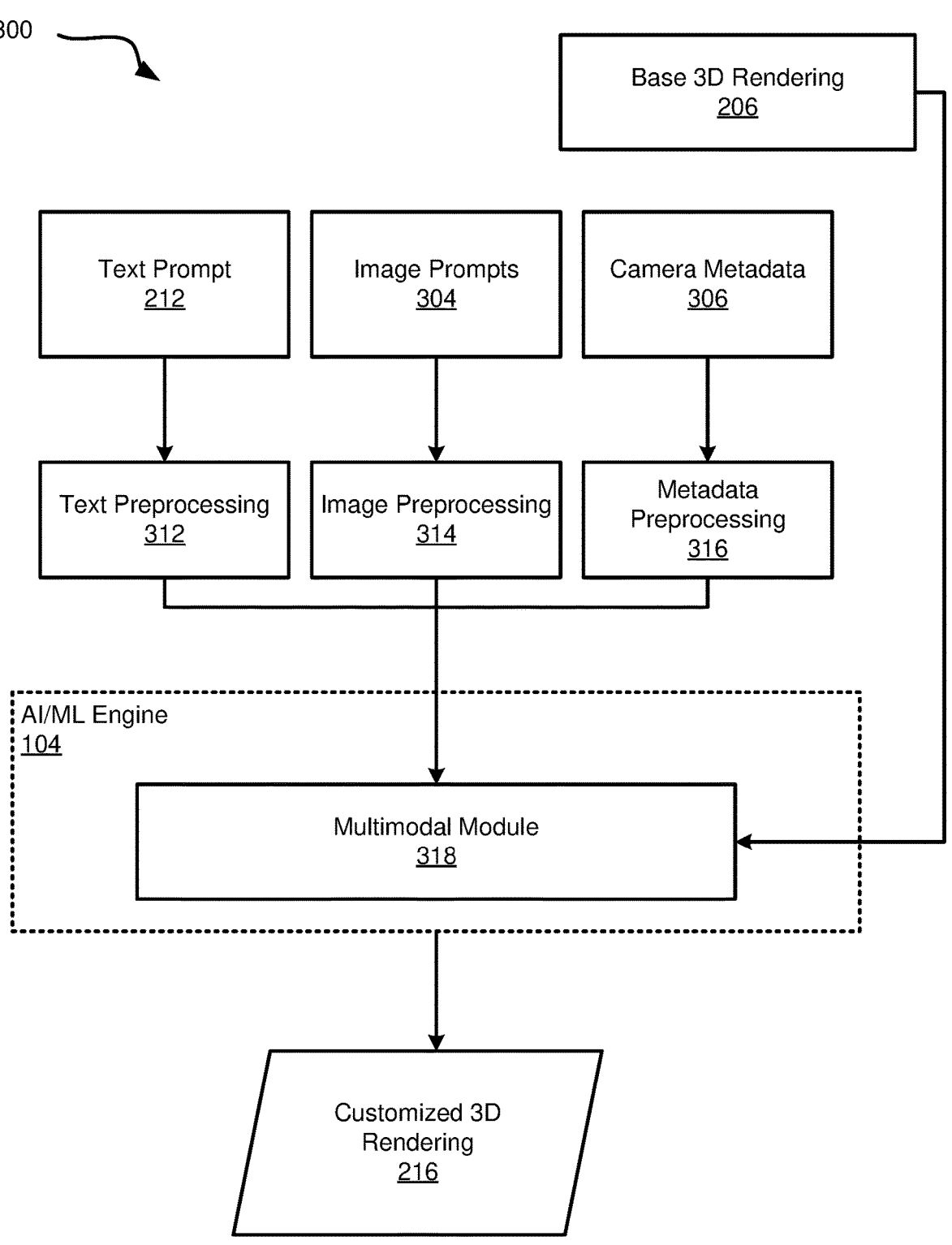
FIG. 3 is a schematic block diagram of a process flow for generating a customized multi-layered rendering of a space.

FIG. 3 is a schematic block diagram of a process flow 300 for generating the customized 3D rendering 216 based on the base 3D rendering 206 and additional data inputs. The process flow 300 is executed by the AI/ML engine 104, which includes a multimodal module 318. The multimodal module 318 relies upon specialized preprocessing modules to separately establish standardization across different input samples for efficient training of the AI/ML engine 104. The preprocessing pipeline includes three distinct types of pre-processing modules, including a text prompt preprocessing module, an image preprocessing module, and a camera metadata preprocessing module. This introduces a mechanism to corroborate information in text prompts together with predefined labels added to prompts for every layer. This aids the text prompt preprocessing module to accurately curate the input text before providing the input text to the AI/ML engine 104 to obtain corresponding text prompt embeddings for the customized 3D rendering 216.

The process flow 300 includes providing the base 3D rendering 206 to the multimodal module 318 of the AI/ML engine 104. The multimodal module 318 additionally receives preprocessed text inputs, preprocessed image inputs, and preprocessed metadata inputs as shown. The text inputs, image inputs, and metadata inputs are preprocessed prior to being received by the AI/ML engine 104. Each of these inputs may be preprocessed by a separate preprocessing engine executed by the generative rendering server 102 or another processing resource.

The text prompt 212 undergoes text preprocessing 312 by a text preprocessing module. The text preprocessing 312 includes processing the text prompts 212 and associated tags using a combination of techniques which include keyword filtering, stop word removal, lemmatization, and text encoding. A universal module may be applied to multiple text prompts 212 that are obtained as input to the AI/ML engine 104 for global context understanding and footprint size reduction. The generated embedding representation of each text prompt 212 is utilized in downstream modules where it is processed together with image embeddings and metadata embeddings.

The AI/ML engine 104 may additionally receive an image prompt 304 from a user. The image prompt 304 undergoes image preprocessing 314 by an image preprocessing module. The image preprocessing 314 includes preprocessing the image prompts 304 and additionally includes preprocessing two-dimensional snapshots of the scene and three-dimensional renderings of the scene. The AI/ML engine 104 receives two distinct types of image inputs, including a snapshot "master image" of the space that requires modifications, and associated reference image prompts 304 provided with the text prompts 212 for each layer related to the input snapshot image. These two distinct types of input images and processed differently.

The master image is first checked for the accurate aspect ratio and size as per the input dimension of the image pipeline and is corrected by using padding and resizing. The master image may be stored in RGB color space. The image prompts 304 undergo a complex preprocessing pipeline including various data augmentation techniques like batching, random crop, padding, random rotation, horizontal flipping, and vertical flipping. The image prompts 304 additionally undergo a feature extraction that generates image embedding representations to be used in later multimodal pipelines of the AI/ML engine 104.

The AI/ML engine may additionally receive camera metadata 306 that undergoes metadata preprocessing 316. Apart from the text prompts 212, image prompts 304, and other image inputs, the AI/ML engine 104 additionally consumes three-dimensional spatial metadata for the master image (i.e., the reference for the customized 3D rendering 216 to be generated). Specifically, the AI/ML engine 104 utilizes metadata like the camera orientation, camera coordinates from a fixed references, camera field of view, and camera view type. This camera metadata 306 is extracted and provides additional control and direction for the image generation process by the AI/ML engine 104. The metadata preprocessing 316 includes serialization and standardization of the camera metadata 306, and then processing by a shallow feedforward block to extract embeddings representations which are later passed on to the multimodal module 318 together with other text embeddings and image embeddings.

The multimodal module 318 receives preprocessed embeddings and consumes those preprocessed embeddings together in a multimodal diffusion module. The multimodal diffusion module includes multiple transformer blocks and diffusion blocks. This module of the AI/ML engine 104 is composed of pretrained weights that are fine-tuned during the training process.

The AI/ML engine 104 is trained using an objection function (i.e., loss function) to tune the parameters of the multimodal module 318 using backpropagation. The AI/ML engine 104 uses a loss function that captures the semantics of the scene's layout and the generative quality based on the text prompts and image prompts passed as user inputs. In some implementation, the AI/ML engine 104 may be trained using tools such as PyTorch®, TensorFlow®, and others, and may utilize open-source libraries such as Hugging Face Diffusers®, LLAMA, and SAM.

Figure 4:
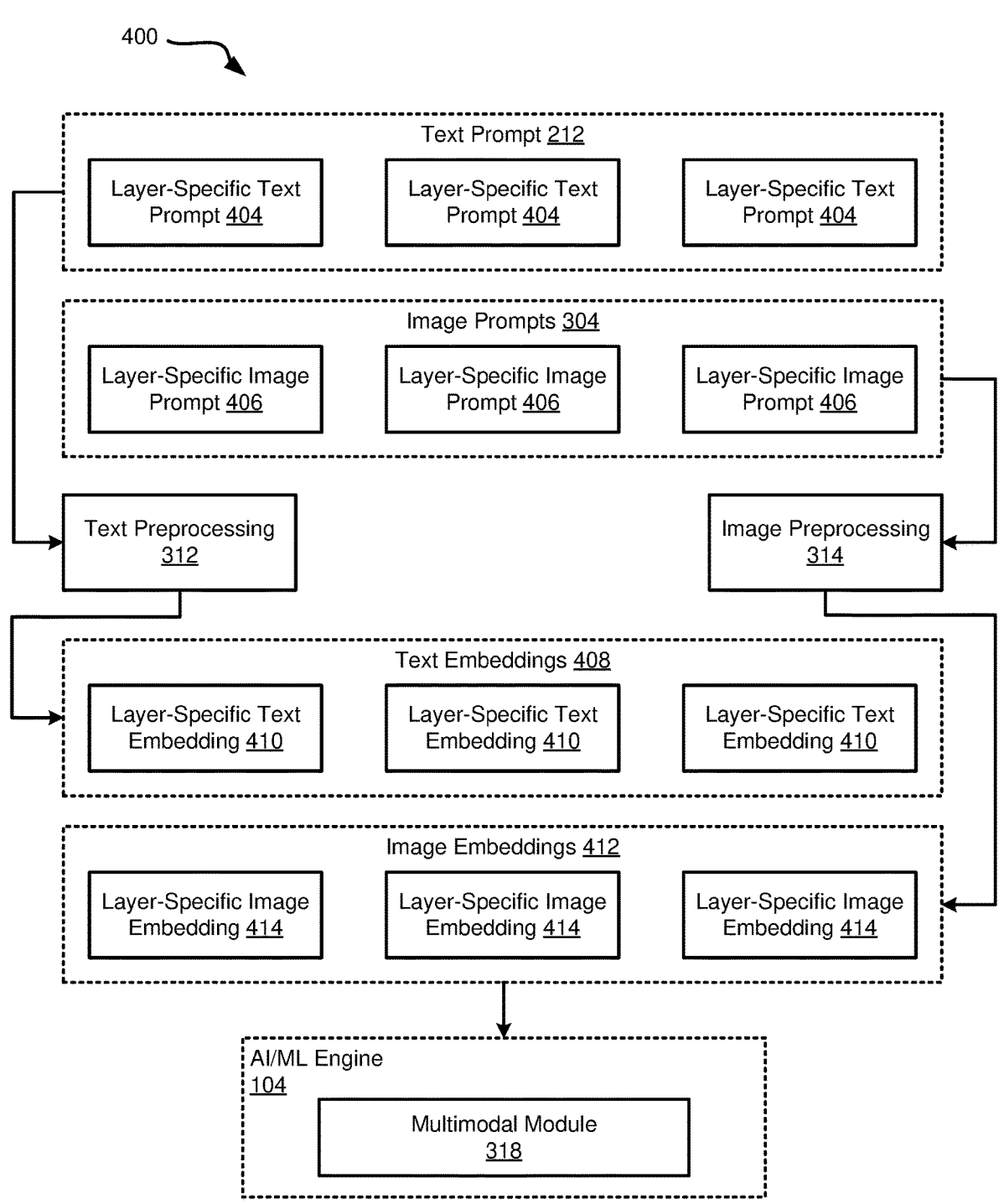
FIG. 4 is a schematic block diagram illustrating a process flow for providing data inputs into a multimodal module of an artificial intelligence and/or machine learning (AI/ML) engine.

FIG. 4 is a schematic block diagram of a process flow 400 for providing data inputs to the multimodal module 318 of the AI/ML engine 104. The multimodal module 318 receives text embeddings 408 and image embeddings 412, which represent preprocessed versions of the user-initiated text prompts 212 and the user-initiated image prompts 304 as shown in FIG. 4.

When a user seeks to further customize the layered 3D rendering 210, the user will provide text prompts 212 and/or image prompts 304 to the AI/ML engine 104. In some cases, the text prompts 212 may include one or more layer-specific text prompts 404. A layer-specific text prompt 404 is applied to an identified "layer" within the layered 3D rendering 210. The identified layer may include an identified object, key point, or region within the layered 3D rendering 210. In an example implementation, a "layer" represents items within a kitchen rendering, such as a flooring region, wall region, window, countertop, lighting, furniture, cabinet, and so forth. The layer-specific text prompt 404 comprises a textual instruction for customizing a certain layer within the layered 3D rendering 210. Further to the above example, a layer-specific text prompt 404 could say, for example, "pale blue subway tile in herringbone configuration" and be applied to a backsplash layer within the layered 3D rendering 210. In another example, the layer-specific text prompt 404 could identify an actual item that is available for purchase, such as a specific tile, flooring, paint color, cabinetry design, lighting fixture, furniture fixture, and so forth.

In some cases, the image prompts 304 include one or more layer-specific image prompts 406. The layer-specific image prompts 406 are similar to the layer-specific text prompts 404 because they are also applied to an identified layer within the layered 3D rendering 210. However, the layer-specific image prompts 406 include an image rather than a textual input. Further to the above example, a layer-specific image prompt 406 could include an image of an actual appliance available for purchase, and this image could be applied to an appliance layer within the layered 3D rendering 210.

As shown in FIG. 4, each of the text prompts 212, including each of the layer-specific text prompts 404, undergoes text preprocessing 312 to be converted to text embeddings 408. Thus, each layer-specific text prompt 404 undergoes text preprocessing 312 to be reformatted into a layer-specific text embedding 410. Likewise, each of the image prompts 304, including each of the layer-specific image prompts 406, undergoes image preprocessing 314 to be converted to image embeddings 412. Thus, each layer-specific image prompt 406 undergoes image preprocessing 314 to be reformatted into a layer-specific image embedding 414. The text embeddings 408 and image embeddings 412 are then fed to the multimodal module 318 of the AI/ML engine 104 for generating the customized 3D rendering 216.

Figure 5:
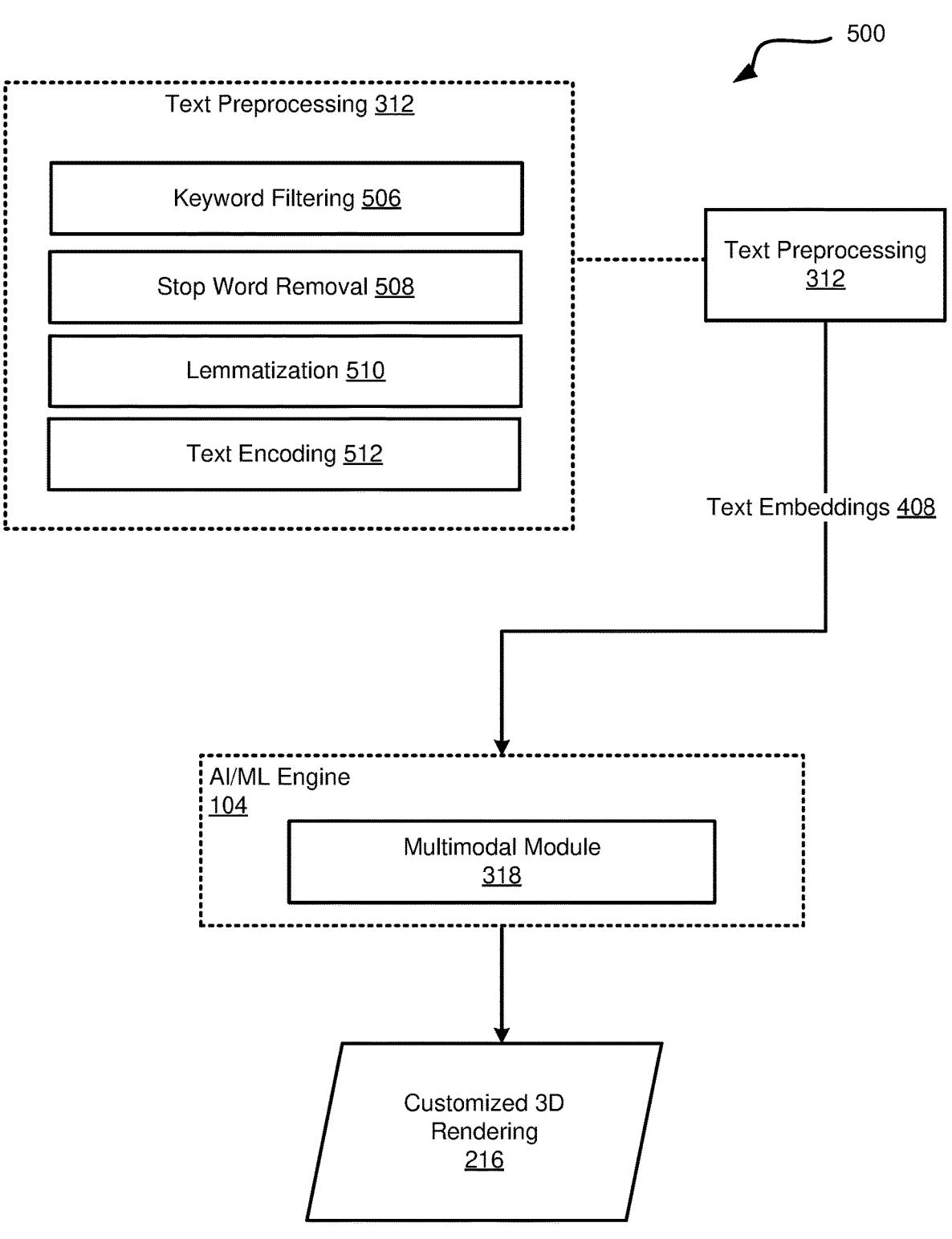
FIG. 5 is a schematic block diagram of a process flow for executing text data preprocessing.

FIG. 5 is a schematic block diagram of a process flow 500 for executing text preprocessing 312 prior to providing text embeddings 408 to the multimodal module 318 of the AI/ML engine 104. The text preprocessing 312 includes one or more of keyword filtering 506, stop word removal 508, lemmatization 510, and text encoding 512, and may include other text preprocessing techniques.

Figure 6:
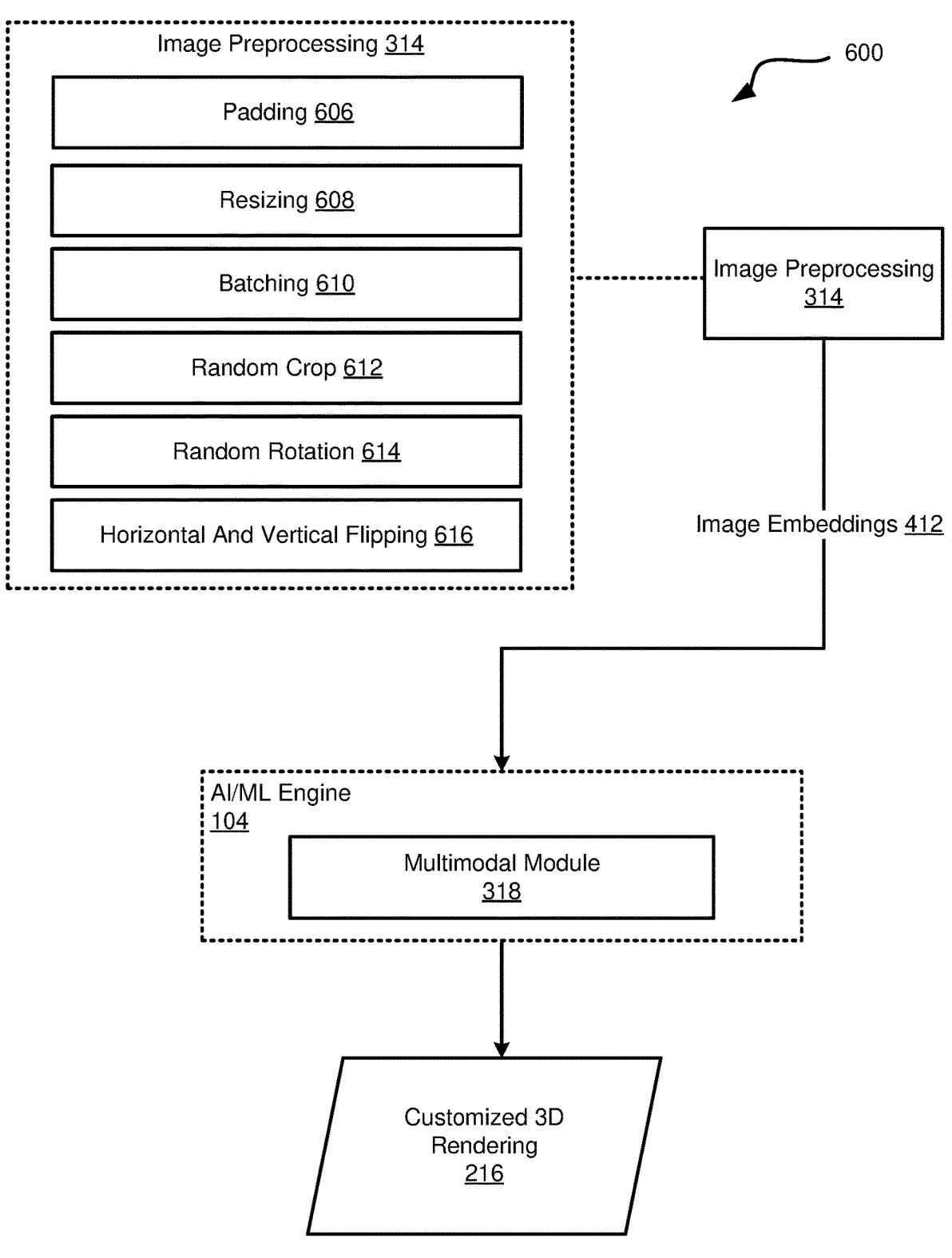
FIG. 6 is a schematic block diagram of a process flow for executing image data preprocessing.

FIG. 6 is a schematic block diagram of a process flow 600 for executing image preprocessing 314 prior to providing image embeddings 412 to the multimodal module 318 of the AI/ML engine 104. The image preprocessing 314 includes one or more of padding 606, resizing 608, batching 610, random crop 612, random rotation 614, and horizontal and vertical flipping 616, and may include other image preprocessing techniques.

Figure 7:
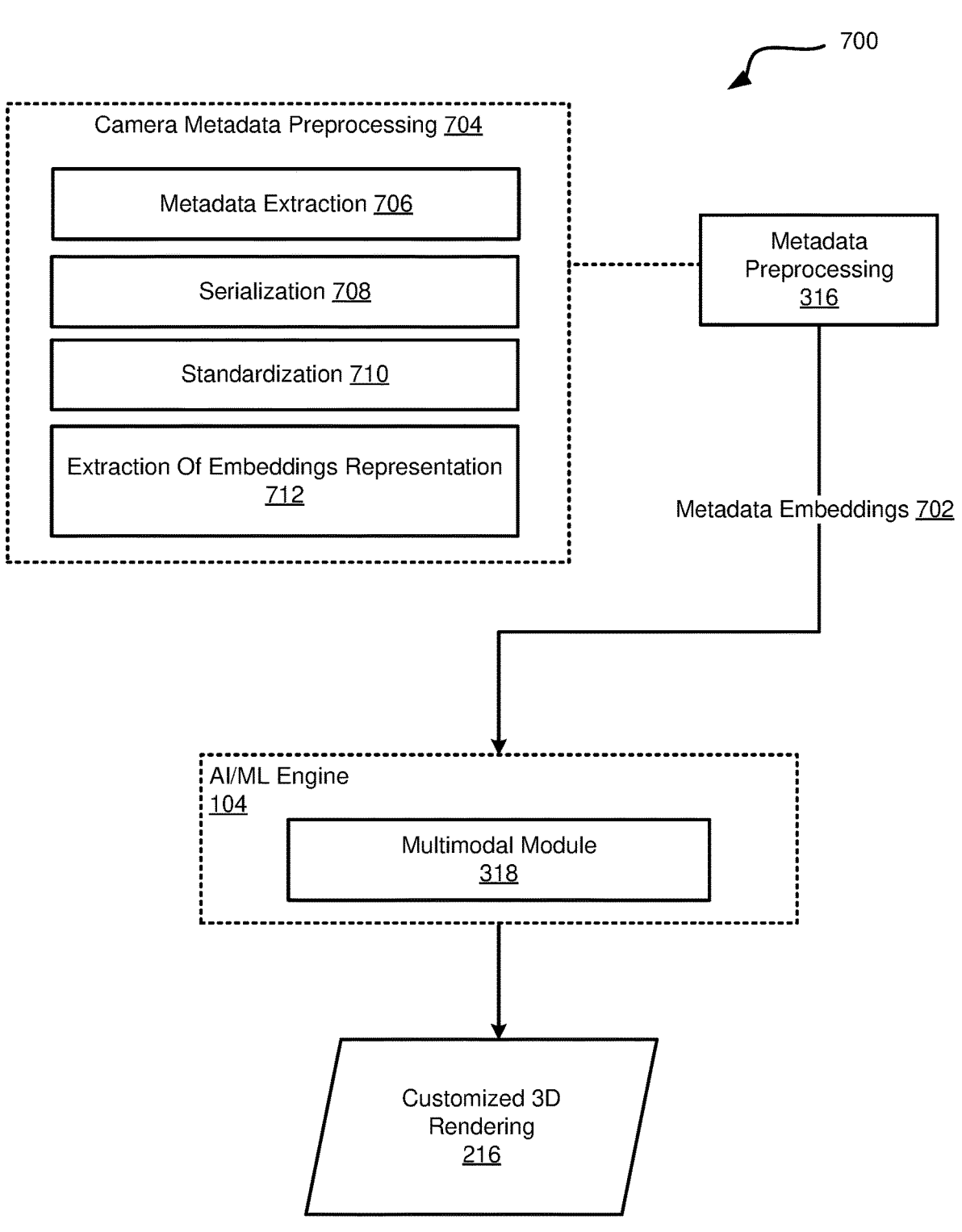
FIG. 7 is a schematic block diagram of a process flow for executing metadata preprocessing.

FIG. 7 is a schematic block diagram of a process flow 700 for executing metadata preprocessing 316 prior to providing metadata embeddings 702 to the multimodal module 318 of the AI/ML engine 104. The metadata preprocessing 316 includes extracting metadata 706 from camera outputs from a camera that captured an image of a scene to be remodeled. The metadata preprocessing 316 includes serialization 708 and standardization 710 of the camera metadata. The metadata preprocessing 316 includes extraction of embeddings representations 712 of the camera metadata.

Figure 8:
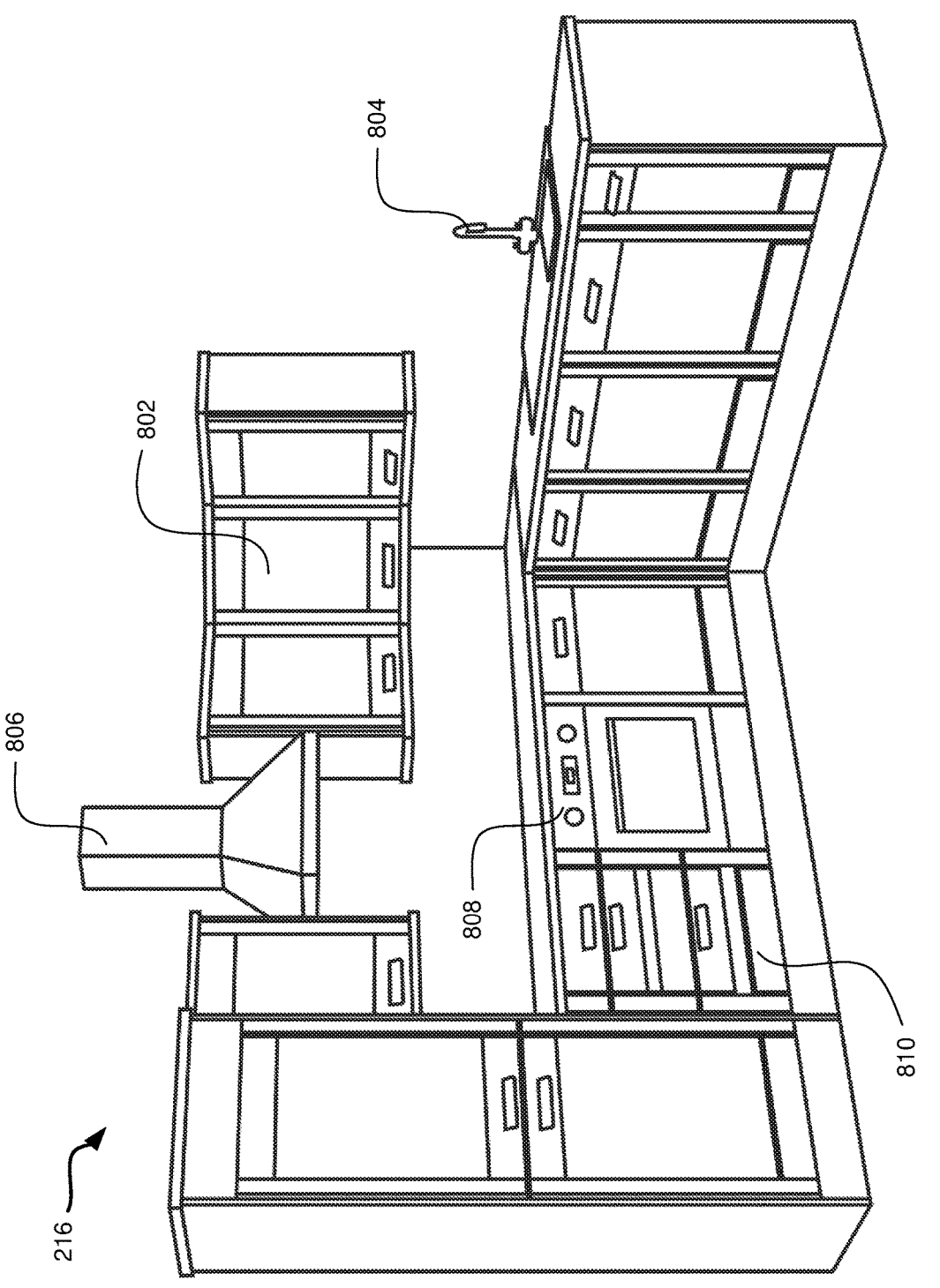
FIG. 8 is a schematic illustration of an example customized multi-layered three-dimensional rendering of a space.

FIG. 8 is a schematic illustration of an example customized 3D rendering 216. The customized 3D rendering includes a plurality of example "layers" or identified key points within the rendering. In the example illustrated in FIG. 8, the customized 3D rendering 216 includes at least a cabinet front layer 802, faucet layer 804, hood vent layer 806, oven layer 808, and cabinet configuration layer 810. It should be appreciated that various renderings will have different quantities and types of layers depending on user preference and the type of scene to be rendered.

According to the systems, methods, and devices described herein, a user may select any layer 802-810 within a layered 3D rendering 210 and provide one or more of a layer-specific text prompt 404 or a layer-specific image prompt 406 to adjust something about that layer 802-810. The AI/ML engine 104 consumes the preprocessed version of the layer-specific text prompt 404 and/or layer-specific image prompt 406 and then adjusts the layered 3D rendering 210 to comply with the user's request. This generates the customized 3D rendering 216 that includes customized layers based on user input.

Figure 9:
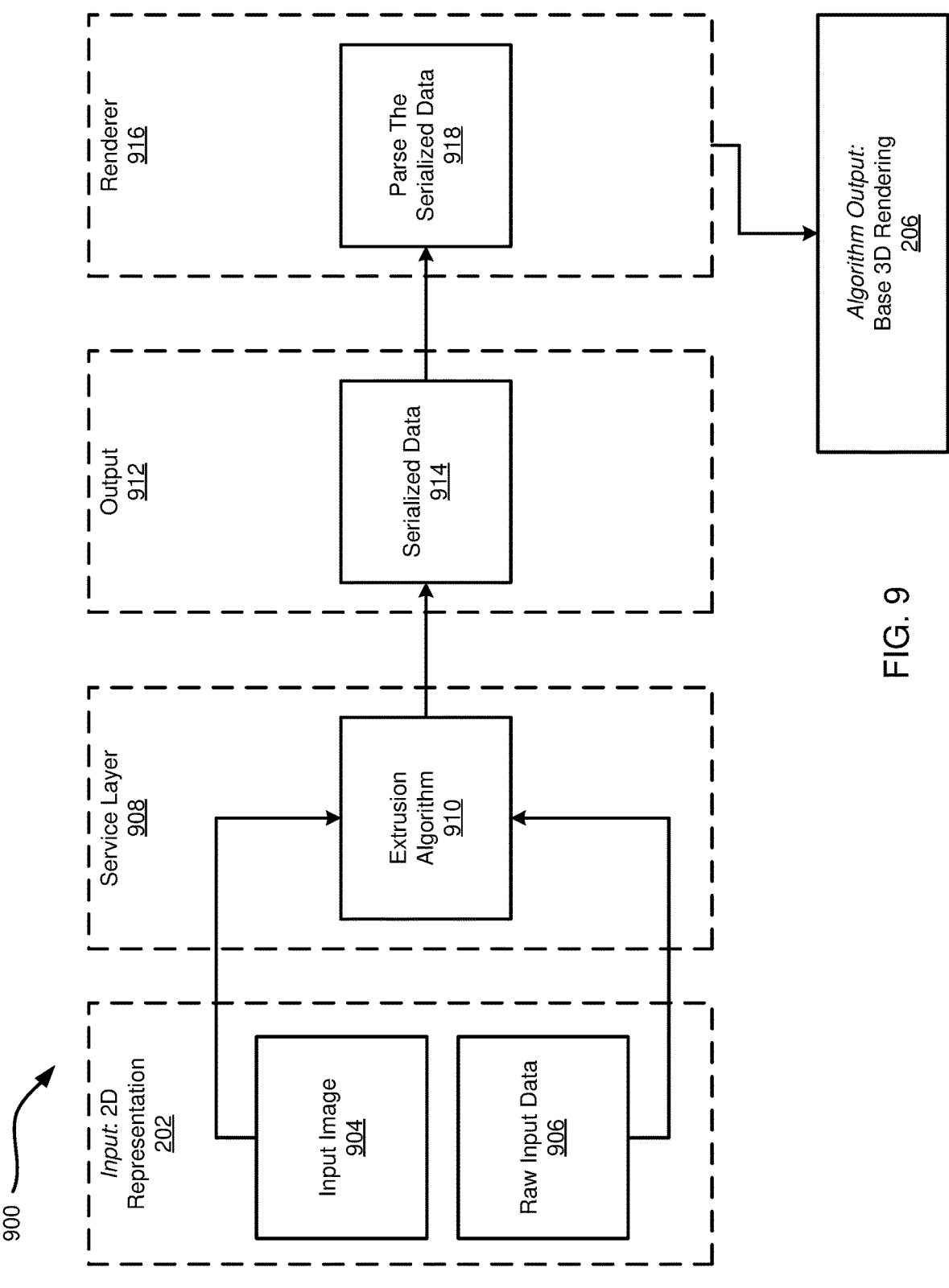
FIG. 9 is a schematic block diagram illustrating a process flow and component diagram for generating a based three-dimensional rendering.

FIG. 9 is a schematic drawing of a process flow 900 and component diagram for generating a three-dimensional output image based on input data. The process flow 900 describes aspects of the extrusion algorithm 204 discussed in connection with FIG. 2.

The extrusion algorithm 204 includes two primary phases. The first phase includes receiving an 2D representation 202, providing the 2D representation 202 to a service layer 908 for performing the extrusion algorithm 204, and receiving the output 912 of the extrusion algorithm 204. The second phase of the extrusion algorithm 204 includes generating additional instructions to be provided to a renderer 916 in combination with the output 912 of the service layer 908. The additional instructions may include, for example, Z-axis coordinates, rulesets on what data should be kept and what data should be discarded, and/or three-dimensional mesh rules that enable the renderer 916 to generate the three-dimensional rendering.

The process flow 900 includes receiving inputs pertaining to the 2D representation 202. The 2D representation 202 inputs may include, for example, an input image 904 and raw input data 906. The process flow 900 includes providing the inputs to a service layer 908 where the extrusion algorithm 204 is performed. The process flow 900 includes receiving an output 912 from the service layer 908, wherein the output 912 may include serialized data 914. The process flow 900 includes providing the serialized data 914 to the renderer 916 that includes a parser 918 for generating a three-dimensional rendering based on the inputs 902.

In an embodiment, the renderer 916 and parser 918 are included in a third-party application for generating the base 3D rendering 206 based on the inputs 902. Example third-party applications include Unity 3D, Unreal, Blender, 3DSMax, and Maya. One or more of these third-party applications can render the serialized data 914 and parse what is needed to generate the base 3D rendering 206 of the scene when provided with additional instructions on how to execute the rendering. These additional instructions enable a third-party application (or internal application) to visually extrude the code and add Z-axis coordinates to generate the base 3D rendering 206. In an embodiment, the parser 918 includes a neural network or provides information for training a neural network. The neural network may be trained on a set of rules regarding which artifacts should be kept and which artifacts should be discarded.

The input image 904 may include a drawing of an architectural floorplan, landscaping plan, or other diagram. In an embodiment, the input image 904 is a two-dimensional drawing, and in alternative embodiments the input image 904 may include a capture of a three-dimensional drawing. The input image 904 may include a computer-generated drawing, a hand-drawn drawing, a photograph of a printed computer-generated drawing, a photograph of a hand-drawn drawing, and so forth. The input image 904 may include any suitable data type such as, for example, jpg, jpeg, png, pdf, raw data captured by a camera image sensor, and so forth.

The raw input data 906 may include raw code from an augmented reality program. In an embodiment, an augmented reality program may be leveraged to capture measurements, shapes, and dimensions of an existing space. For example, a user may leverage light detection and ranging (LIDAR) capabilities of a mobile computing device in conjunction with an augmented reality program to scan an existing space and capture the measurements, shapes, and dimensions of the space. The existing space may include, for example, the architectural structure of a building, landscaping structures, semi-permanent or permanent structures within a space such as cabinetry, doors, windows, plumbing fixtures, and so forth, non-permanent structures within a space such as furniture and other furnishings, and so forth. In an embodiment, a LIDAR system is used to measure the distance from the LIDAR transmitter to a wall, cabinet, or other structure, and to thereby calculate the shapes, measurements, and dimensions of existing of rooms and other structures. These shapes, measurements, and dimensions may be provided as raw input data 906 for use in generating a three-dimensional rendering of a space. In an embodiment, the raw input data 906 includes raw LIDAR data.

In an embodiment, the raw input data 906 generated by augmented reality and/or LiDAR can be used to generate a geometric vector diagram of a scene. The geometric vector diagram includes x, y, z serialized data 914 that may be used to generate a three-dimensional rendering of a scene. LiDAR includes the use of lasers for exceptional accuracy and augmented reality may be based more on a user's movement through an environment.

In an embodiment, the extrusion algorithm 204 is wrapped around a service layer that can run on a rendering server independent of other backend processes performed by the generative rendering server 102. The extrusion algorithm 204 is configured to serialize the 2D representation 202 to generate serialized data 914 that can be provided to the renderer 916. The extrusion algorithm 204 may include instructions to be performed by one or more processors for reading the 2D representation 202, tracing the 2D representation 202 data, graphing the 2D representation 202 data, and prioritizing the 2D representation 202 data to generate the serialized data 914.

The output 912 of the extrusion algorithm 204 within the service layer 902 is serialized data 914. The extrusion algorithm 204 includes instructions for serialization to translate the 2D representation 202 to a format that can be stored, transmitted, and/or reconstructed later for other uses. When the serialized data 914 is reread according to the serialization format, the serialized data 914 can be used to create a semantically identical clone of the 2D representation 202.

The renderer 916 parses the serialized data 914 to generate the base 3D rendering 206. In an embodiment, the renderer 916 is an application program interface (API) that may function as a real-time editor and generator of three-dimensional renderings of a space. The renderer 916 may create a three-dimensional rendering of a space that can be altered and interacted with by a user in real-time. The renderer 916 may create an image of a rendering of a space that may be saved, printed, or transmitted. In an embodiment, a user of the rendering platform 102 may interact with the renderer 916 API to amend the three-dimensional rendering by, for example, adding walls or other structures, moving wall or other structures, deleting walls or other structures, and so forth. The renderer 916 may be run on the generative rendering server 102 and may operate independently of the extrusion algorithm 204.

In an embodiment, the process flow 900 includes applying additional data and instructions to the output 912 of the service layer 908. This additional data and instructions can be provided to a third-party renderer 916 to enable the renderer 916 to parse the serialized data 914 and generate the base 3D rendering 206. The renderer 916 may need to be instructed on how to generate the three-dimensional model. These additional instructions may include, for example, Z-axis coordinates applied to the serialized data 914. The serialized data 914 may include a geometric vector diagram representing lines and other objects within the 2D representation 202. Z-axis coordinates may additionally be applied to the geometric vector diagram to enable the renderer 916 to generate the base 3D rendering 206. This may be particularly useful in an implementation where the input image 904 is a two-dimensional drawing of an architectural floorplan, city design, landscaping design, and so forth, and the process flow 900 is applied to generate the base 3D rendering 206. The additional instructions may further include, for example, instructions on what data should be kept and what data should be discarded, and/or instructions on how to generate the base 3D rendering 206. These instructions may be implemented by "internal" processors for the generative rendering server 102 or may be provided to an external program configured to generate the base 3D rendering 206.

Figure 10:
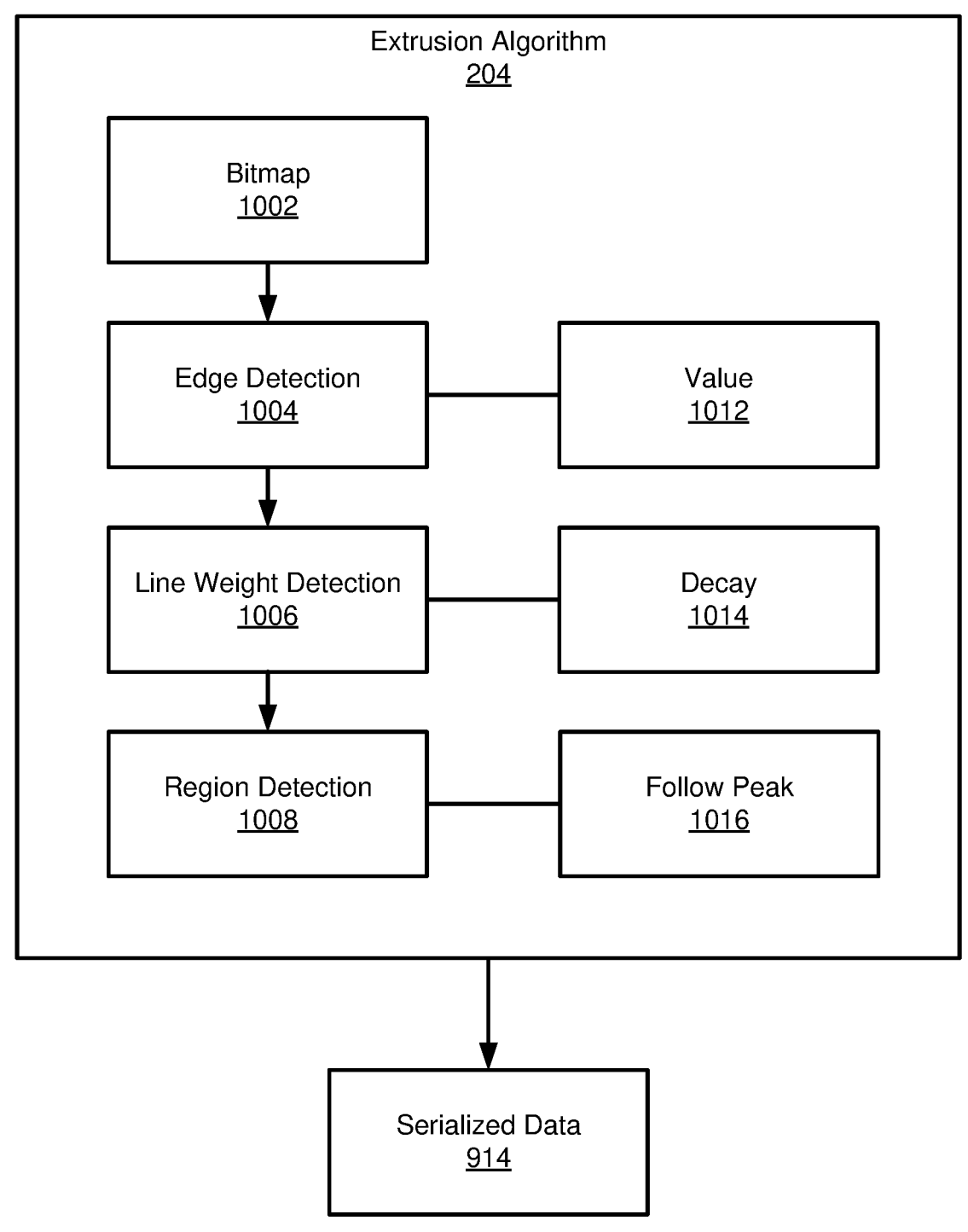
FIG. 10 is a schematic block diagram illustrating a process flow for an extrusion algorithm.

FIG. 10 is a schematic diagram illustrating a process flow that may be performed by one or more processors executing the extrusion algorithm 204. Given a specific input, the service layer 908 may run a process including a plurality of layers to create the serialized data 914. In the process flow illustrated in FIG. 10, the bottom of the extrusion algorithm 204 is the base layer and each layer builds upon the other.

Prior to performing the extrusion algorithm 204, the inputs 904, 906 may be validated and normalized to a set standard. For example, the inputs 904, 906 may be validated to determine whether the inputs 904, 906 are of a sufficient quality for performing the extrusion algorithm 204. In an embodiment, the inputs 904, 906 are validated to determine whether they satisfy certain conditions such as file size, dimensions, clarity, white balance, and so forth. After the inputs 904, 906 are validated, the extrusion algorithm 204 includes creating a bitmap 1002 based on the input 302. The bitmap 1002 represents the inputs 904, 906 as an image. In an embodiment, the bitmap 1002 represents the inputs 904, 906 as a Red-Green-Blue (RGB) image comprising eight-bit channels. The bitmap 1002 may be loaded to an image library in any standard image format such as jpg, jpeg, png, pdf, and so forth.

The extrusion algorithm 204 includes performing one or more of edge detection 1004, line weight detection 1006, and region detection 1008 on the bitmap 1002. The edge, line weight, and region detections 1004-1008 may be performed by executing value 1012, decay 1014, and follow peak 1016 steps.

The value 1012 step includes generating a binary map indicating the distance each pixel in the bitmap 1002 is from the nearest edge. In an embodiment, the value 1012 includes analyzing the color of each pixel and returning a binary integer indicating whether the pixel is "dark enough" to be considered as being "on" and further to be considered a portion of a line or other object within the input image.

The decay 1014 step may include generating a depth map based on the binary map and indicating the distance each pixel is from the nearest edge. The decay 1014 step may include receiving information from the value 1012 step indicating whether pixels are "on" or "off" and then generating "mountains" from the lines. The "center" of a line is the peak of the mountain, and the edge of the line is the lowest point in the mountain. The decay 1014 layer may further fine tune the artifacts to keep or discard.

The follow peak 1016 step may include tracing lines based on the depth map. The region detection 1008 includes identifying closed regions, and this may be performed with a flood fill algorithm in some embodiments. The extrusion algorithm 204 may include identifying region types, for example, whether a region comprises a wall or a bank of cabinets, based on the results of the region detection 1008. The follow peak 1016 may be analogized to walking on a roofline until the roofline turns or terminates. In the analogy, a change in the direction to the roofline is similar to a change in direction of a line of the bitmap 1002. When the "on" pixels of a line terminate in the original direction and continue in a different direction, the line has changed direction and may include an angle, a curve, or some other geometric change.

The edge detection 1004 process is performed to identifying edges of "on" or "off" color pixels within the bitmap 1002. The results of the edge detection 1004 process can indicate where the perimeter of a floorplan is located, where walls within the floorplan are located, where cabinets within the floorplan are located, and so forth. The edge detection 1004 process includes examining the bitmap 1002 to determine the values 1012 of RGB pixels and then determine whether those values 1012 satisfy a threshold. The threshold indicates whether the value 1012 of the pixel qualifies the pixel as being "on" or "off." A pixel that is deemed as being "on" may indicate a wall, cabinet, or other structure within the floorplan of the input 302 data. A pixel that is deemed as being "off" may indicate an open space or non-wall within the floorplan.

In an embodiment, the edge detection 1004 process includes applying a stencil buffer of the same resolution of the bitmap 1002 to represent pixels as being "on" or "off." The results of the stencil buffer will essentially yield a black and white solid shape. After the stencil buffer has been performed, then spaces within the stencil buffer can be sampled. In a perfect implementation, empty space pixels are a perfect white and non-empty space pixels (e.g., walls, cabinets, structures, and so forth) are a perfect black. In most implementations, this is not the case, and the pixels will return a range of values. In an embodiment, edge detection 1004 process includes assigning a value 1012 to each pixel and then grouping lighter pixel values together and grouping darker pixel values together. The lighter pixel values may be associated with pixels that are "off," i.e., pixels that represent an empty space in the floorplan. The darker pixel values 1012 may be associated with pixels that are "on," i.e., pixels that represent a non-empty space within the floorplan such as a wall, cabinet, or other structure. This process may be done for each input 302 on a case-by-case basis. In an embodiment, the edge detection 1004 process begins with finding a midpoint value within the image. Typically, there is a smaller range for the light values than for darker values, and therefore, it can be easier to identify what classifies as white within the bitmap 1002. This process is typically more challenging when the inputs 904, 906 is a photograph of a line drawing or other document rather than a direct input of a computer-generated line drawing.

In an example implementation of the edge detection 1004 process, the extrusion algorithm 204 is performed on a black-and-white line drawing of an architectural floorplan. The bitmap 1002 of the architectural floorplan may have a plurality of walls that need to be identified. The border pixels of the walls may be a darker color than the interior pixels of the walls. Even still, the walls in the architectural floorplan can be identified by sampling the pixels in the floorplan and determining whether the pixels are dark or light.

In an embodiment, the edge detection 1004 process includes applying a growth algorithm. As discussed herein, a "growth algorithm" includes processes and algorithms associated with its inverse, which may commonly be referred to as a decay algorithm. A growth algorithm and a decay algorithm are inverses of one another and may functionally result in the same output information. Reference herein to a "growth algorithm" includes processes, steps, methods, and algorithms are associated with each of a growth algorithm and a decay algorithm. The growth algorithm may be applied to the bitmap 1002 pixel-by-pixel to identify which pixels are "on" and which pixels are "off." The growth algorithm can be used to identify the edges and peaks of lines within the bitmap 1002.

The line weight detection 1006 process can be implemented to differentiate walls from other lines such as cabinets, doors, windows, and so forth. In typical floorplan drawings, walls will be illustrated with darker or thicker lines than other objects. In an embodiment, the stencil buffer provides valuable information for the line weight detection 1006 step. It can be important to differentiate between walls, windows, cabinets, doors, and so forth, but in the stencil buffer stage, the input consists only of solid lines. After the stencil buffer is applied, the extrusion algorithm 204 includes identifying lines and assigning a weight to the lines. This may be performed by implementing a grow algorithm. The grow algorithm includes beginning from a center pixel within a line and growing from there to identify whether the pixel is part of a line, and further to identify the thickness of the line. At each layer, the width of the line will decrease.

In an embodiment, the growth algorithm includes removing a first layer of a line pixel-by-pixel. This first layer may be referred to as layer one. After the first layer of the line has been removed, the growth algorithm proceeds with removing the second layer of the line. The second layer of the line may be referred to as layer two. The growth algorithm includes counting the number of layers that are removed from the line until the center of the line has been reached. This count can be used to determine the thickness of the line.

In an embodiment, the growth algorithm is referred to as a decay 1014 algorithm at the pixel level. As discussed herein, the term "growth algorithm" includes processes, steps, methods, and algorithms associated with a growth algorithm and/or a decay algorithm. The growth algorithm is built from the decay algorithm and may occur simultaneously as the growth algorithm and the decay algorithm work together. The growth algorithm travels around each line to add mass or weight while the decay algorithm performs the inverse of this operation. The decay algorithm may run very quickly to trim pixel edges off lines through a decay process. In an embodiment, a timestamp is recorded that represents when the decay algorithm reached a certain pixel. Termination of the decay algorithm may occur when all pixels have been removed from the bitmap 1002.

After the decay 1014 algorithm is performed, the peak of each line is identified and followed to identify the geometry of the line (see follow peak 1016). This can be particularly useful in an implementation where lines within the floorplan are shaded differently to represent different structures. For example, interior walls and exterior walls may be shaded differently, or there may be a shading system for identifying load-bearing walls versus non-load-bearing walls, and so forth. When the peak is identified, the peak is followed continually until it ends. The peak ends when a different structure is identified. This may occur when a wall rounds a corner or ends, for example. After the end of the peak has been identified, then the algorithm returns to the first identified location of the peak, and the peak is travelled in the opposite direction until it ends again. In an embodiment, the results of this process are analyzed to identify patterns within an input drawing. Such patterns may include, for example, an indication that lines with certain weight ranges are associated with interior walls, exterior walls, load-bearing walls, non-load-bearing walls, cabinets, windows, doors, and so forth. These patterns can be saved and analyzed by a machine learning algorithm to aid in assessing future input drawings.

In an embodiment, the ending point of the peak indicates where a line changes direction rather than a complete termination of the line. At a corner, curve, or other point where a line changes direction, the peak will terminate and begin again in the new direction. It should be appreciated that the ending point of a line may indicate the beginning of a new direction for the line. The ending point may signify where the line takes a turn of any angle.

After interior and exterior walls, cabinets, doors, windows, and so forth have been identified based on the line weight detection 1006 process, the extrusion algorithm 204 performs region detection 1008 to identify closed spaces within the floorplan or landscaping design. The region detection 1008 includes determining where rooms or areas are connected or not connected. The region detection 1008 process identifies enclosed regions such as rooms, cabinets, islands, and so forth. In an embodiment, the region detection 1008 includes a flood fill algorithm. The flood fill algorithm includes analyzing the image to locate empty values, and then filling the corresponding region with a flood fill.

In an embodiment, the flood fill algorithm begins with a single pixel and fills in that pixel. The flood fill algorithm continues by identifying neighboring pixels and filling in those neighboring pixels. The flood fill algorithm continues this process recursively until hitting an edge such as a wall, cabinet, door, window, and so forth. The termination of the flood fill algorithm occurs when an edge has been reached. In an embodiment, each closed or open region is filled with a distinct color value. It should be appreciated that the flood fill algorithm may apply any color value to a region, including true black or true white. The region detection 1008 steps can be used to identify enclosed areas and show the geometry within a certain region, and further to identify the width and shape of the region.

In an embodiment, the extrusion algorithm 204 further includes hiding and adding to the two-dimensional geometric space. Portions of the two-dimensional geometric space may be hidden and discarded. Additionally, the extrusion algorithm 204 may add to portions of the two-dimensional geometric space to apply vertical space by way of Z coordinates or other information needed to generate a three-dimensional rendering of the space.

The extrusion algorithm 204 results in a serialized data 914 output. In some embodiments, the serialized data 914 output may be referred to as metadata. The serialized data 914 represents the two-dimensional geometry extracted from the bitmap 402 and can be used to construct three-dimensional geometry. The serialized data 914 may be automatically created code that represents defined parameters. The parameters may include specific patterns found in a line drawing. The serialized data 914 output may be configured into any three-dimensional modeling editor and may be ready for common file extensions such as STL, OBJ, FBX, COLLADA, 3DS, IGES, STEP, VRML/X3D, and so forth.

Figure 11:
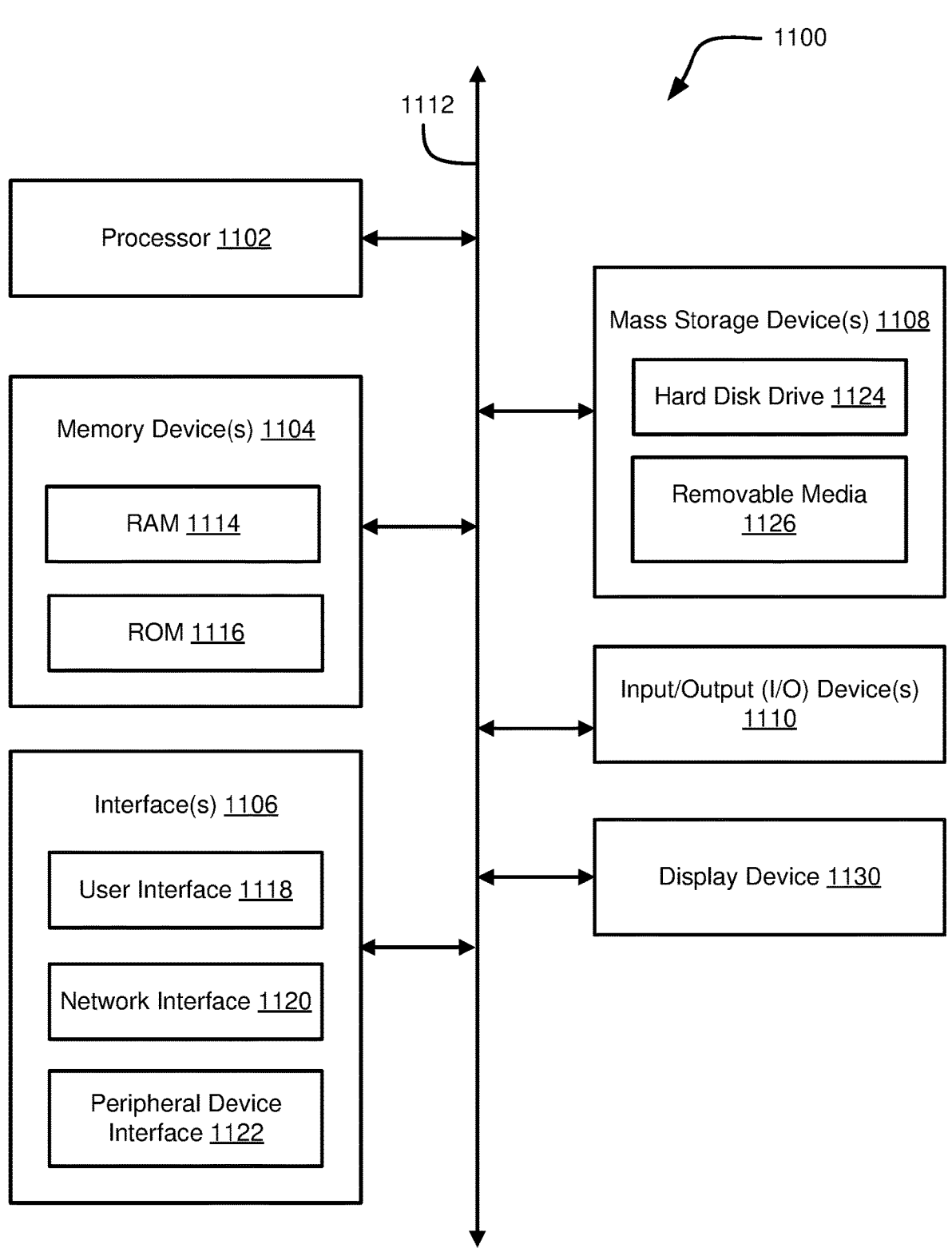
FIG. 11 is a schematic block diagram of an example computing system according to an example embodiment of the systems and methods described herein.

Referring now to FIG. 11, a block diagram of an example computing device 1100 is illustrated. Computing device 1100 may be used to perform various procedures, such as those discussed herein. Computing device 1100 can perform various monitoring functions as discussed herein, and can execute one or more application programs, such as the application programs or functionality described herein. Computing device 1100 can be any of a wide variety of computing devices, such as a desktop computer, in-dash computer, vehicle control system, a notebook computer, a server computer, a handheld computer, tablet computer and the like.

Computing device 1100 includes one or more processor(s) 1112, one or more memory device(s) 1104, one or more interface(s) 1106, one or more mass storage device(s) 1108, one or more Input/output (I/O) device(s) 1110, and a display device 1130 all of which are coupled to a bus 1112. Processor(s) 1112 include one or more processors or controllers that execute instructions stored in memory device(s) 1104 and/or mass storage device(s) 1108. Processor(s) 1112 may also include diverse types of computer-readable media, such as cache memory.

Memory device(s) 1104 include various computer-readable media, such as volatile memory (e.g., random access memory (RAM) 1114) and/or nonvolatile memory (e.g., read-only memory (ROM) 1116). Memory device(s) 1104 may also include rewritable ROM, such as Flash memory.

Mass storage device(s) 1108 include various computer readable media, such as magnetic tapes, magnetic disks, optical disks, solid-state memory (e.g., Flash memory), and so forth. As shown in FIG. 11, a particular mass storage device 1108 is a hard disk drive 1124. Various drives may also be included in mass storage device(s) 1108 to enable reading from and/or writing to the various computer readable media. Mass storage device(s) 1108 include removable media 1126 and/or non-removable media.

I/O device(s) 1110 include various devices that allow data and/or other information to be input to or retrieved from computing device 1100. Example I/O device(s) 1110 include cursor control devices, keyboards, keypads, microphones, monitors, touchscreen devices, or other display devices, speakers, printers, network interface cards, modems, and the like.

Display device 1130 includes any type of device capable of displaying information to one or more users of computing device 1100. Examples of display device 1130 include a monitor, display terminal, video projection device, and the like.

Interface(s) 1106 include various interfaces that allow computing device 1100 to interact with other systems, devices, or computing environments. Example interface(s) 1106 may include any number of different network interfaces 1120, such as interfaces to local area networks (LANs), wide area networks (WANs), wireless networks, and the Internet. Other interface(s) include user interface 1118 and peripheral device interface 1122. The interface(s) 1106 may also include one or more user interface elements 1118. The interface(s) 1106 may also include one or more peripheral interfaces such as interfaces for printers, pointing devices (mice, track pad, or any suitable user interface now known to those of ordinary skill in the field, or later discovered), keyboards, and the like.

Bus 1112 allows processor(s) 1112, memory device(s) 1104, interface(s) 1106, mass storage device(s) 1108, and I/O device(s) 1110 to communicate with one another, as well as other devices or components coupled to bus 1112. Bus 1112 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 1800 and are executed by processor(s) 1112. Alternatively, the systems and procedures described herein can be implemented in hardware, or a combination of hardware, software, and/or firmware. For example, one or more application specific integrated circuits (ASICs) can be programmed to conduct one or more of the systems and procedures described herein. As used herein, the terms "module" or "component" are intended to convey the implementation apparatus for accomplishing a process, such as by hardware, or a combination of hardware, software, and/or firmware, for the purposes of performing all or parts of operations disclosed herein. The terms "module" or "component" are intended to convey independent in how the modules, components, or their functionality or hardware may be implemented in different embodiments.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural, functional, object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components or modules, which are terms used to emphasize their implementation independence more particularly. For example, a component or module may be implemented as a hardware circuit comprising custom very large-scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by diverse types of processors. An identified component of executable code may, for instance, comprise one or more physical or logical blocks of computer instructions, which may, for instance, be organized as an object, a procedure, or a function. Nevertheless, the executables of an identified component need not be physically located together but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over separate locations including over different storage devices, and may exist, at least partially, merely as electronic signals on a system or network. The components may be passive or active, including agents operable to perform desired functions.

EXAMPLES

The following examples pertain to further embodiments.

Example 1 is a method. The method includes determining an input image comprising one or more lines and generating a bitmap based on the input image. The method includes performing edge detection on the bitmap to identify the one or more lines in the input image by applying a growth algorithm to pixels of the bitmap. The method includes calculating a pixel width of each of the one or more lines in the input image.

Example 2 is a method as in Example 1, wherein calculating the pixel width of each of the one or more lines in the input image comprises identifying a peak for each of the one or more lines, wherein a peak of a line represents one or two center-most pixels of the line.

Example 3 is a method as in any of Examples 1-2, further comprising: identifying a peak for each of the one or more lines, wherein a peak of a line represents one or two center-most pixels of the line; identifying a peak starting point for the line; following the peak of the line in a first direction beginning at the peak starting point and terminating at a first ending point of the line; and following the peak of the line in a second direction beginning at the peak starting point and terminating at a second ending point of the line.

Example 4 is a method as in any of Examples 1-3, wherein calculating the pixel width of each of the one or more lines comprises identifying a peak of each of the one or more lines and applying a decay algorithm to each of the one or more lines, wherein the decay algorithm begins at the peak of each of the one or more lines.

Example 5 is a method as in any of Examples 1-4, wherein the input image comprises a two-dimensional drawing of an architectural floorplan, and wherein the method further comprises identifying walls in the architectural floorplan based at least in part on the pixel width of each of the one or more lines.

Example 6 is a method as in any of Examples 1-5, further comprising: applying a Z-axis height to the walls in the architectural floorplan; and generating serialized data comprising a geometric vector diagram of the architectural floorplan, wherein the geometric vector diagram can be used to generate a three-dimensional rendering of the architectural floorplan illustrated in the input image.

Example 7 is a method as in any of Examples 1-6, wherein the input image comprises a two-dimensional drawing of an architectural floorplan, and wherein the method further comprises identifying enclosed regions within the architectural floorplan.

Example 8 is a method as in any of Examples 1-7, wherein identifying the enclosed regions within the architectural floorplan comprises: identifying a first pixel comprising an empty value and filling in the first pixel with a color; applying a flood fill to an enclosed region comprising the first pixel by identifying neighboring pixels to the first pixel and filling in the neighboring pixels with the color; recursively applying the flood fill to additional neighboring pixels within the enclosed region; and terminating the flood fill for the enclosed region when perimeter pixels comprising non-empty values are reached by the flood fill.

Example 9 is a method as in any of Examples 1-8, further comprising identifying a plurality of enclosed regions and applying a different color to each of the plurality of enclosed regions.

Example 10 is a method as in any of Examples 1-9, further comprising applying a stencil buffer to the bitmap, and wherein performing edge detection on the bitmap comprises performing edge detection on the bitmap after the stencil buffer has been applied.

Example 11 is a method. The method includes determining a base rendering of a space. The method includes generating a layer within the base rendering, wherein the layer is associated with an identified region within the base rendering. The method includes receiving a layer amendment request comprising instructions for amending the identified region associated with the layer, wherein the layer amendment request comprises one or more of a text prompt or an image prompt. The method includes providing the layer amendment request to an artificial intelligence and/or machine learning (AI/ML) engine configured to generatively render the identified region based on the layer amendment request.

Example 12 is a method as in Example 11, further comprising receiving a customized layered rendering of the space from the AI/ML engine, wherein the customized layered rendering comprises the identified region rendered in accordance with the one or more of the text prompt or the image prompt.

Example 13 is a method as in any of Examples 11-12, wherein the layer amendment request comprises the text prompt; wherein the method further comprises preprocessing the text prompt; and wherein preprocessing the text prompt comprises one or more of filtering out a keyword within the text prompt, removing a stop word in the text prompt, executing a lemmatization technique on the text prompt, or encoding text within the text prompt.

Example 14 is a method as in any of Examples 11-13, wherein providing the layer amendment request to the AI/ML engine comprises providing a preprocessed version of the text prompt to the AI/ML engine.

Example 15 is a method as in any of Examples 11-14, wherein the layer amendment request comprises the image prompt; wherein the method further comprises preprocessing the image prompt; and wherein preprocessing the image prompt comprises one or more of padding, resizing, batching, cropping, or rotating the image prompt.

Example 16 is a method as in any of Examples 11-15, wherein providing the layer amendment request to the AI/ML engine comprises providing a preprocessed version of the image prompt to the AI/ML engine.

Example 17 is a method as in any of Examples 11-16, further comprising generating a plurality of layers within the base rendering, wherein each of the plurality of layers is associated with one or more identified regions within the base rendering.

Example 18 is a method as in any of Examples 11-17, wherein the identified region comprises an object of interest within the space, and wherein the method further comprises executing an object detection and data segmentation algorithm on the base rendering of the space to identify the identified region prior to generating the layer.

Example 19 is a method as in any of Examples 11-18, wherein the space is an interior space, and wherein the identified region associated with the layer comprises one or more of: a furniture object within the interior space; a lighting fixture within the interior space; a wall space within the interior space; a flooring region within the interior space; an appliance within the interior space; a cabinetry object within the interior space; or a décor object within the interior space.

Example 20 is a method as in any of Examples 11-19, wherein the layer amendment request comprises the text prompt comprising instructions to customize the identified region associated with the layer, and wherein the text prompt comprises one or more of: text describing a desired furniture object to be rendered within the identified region; text describing a desired lighting fixture to be rendered within the identified region; text describing a desired wall covering to be rendered within the identified region; text describing a desired floor covering to be rendered within the identified region; text describing a desired appliance to be rendered within the identified region; text describing one or more of a desired cabinetry configuration, desired cabinetry door front, desired cabinetry material, or desired cabinetry color to be rendered within the identified region; or text describing a desired décor object to be rendered within the identified region.

Example 21 is a method as in any of Examples 11-20, wherein the layer amendment request comprises the image prompt comprising an example image to be utilized to customize the identified region associated with the layer, and wherein the image prompt comprises one or more of: an example image depicting a desired furniture object to be rendered within the identified region; an example image depicting a desired lighting fixture to be rendered within the identified region; an example image depicting a desired wall covering to be rendered within the identified region; an example image depicting a desired floor covering to be rendered within the identified region; an example image depicting a desired appliance to be rendered within the identified region; an example image depicting one or more of a desired cabinetry configuration, desired cabinetry door front, desired cabinetry material, or desired cabinetry color to be rendered within the identified region; or an example image depicting a desired décor object to be rendered within the identified region.

Example 22 is a method as in any of Examples 11-21, wherein generating the layer within the base rendering comprises receiving a user input, and wherein the user input comprises one or more of: a request to identify an object type within the base rendering, wherein the identified region comprises the object type; or a user-input selection of the identified region.

Example 23 is a method as in any of Examples 11-22, further comprising: generating a plurality of layers within the base rendering, wherein each of the plurality of layers is associated with a unique identified region within the base rendering; receiving a plurality of layer amendment requests, wherein each of the plurality of layer amendment requests is applicable to one or more of the plurality of layers; providing each of the plurality of layer amendment requests to the AI/ML engine; and receiving from the AI/ML engine a customized layered rendering of the space, wherein the customized layered rendering is responsive to each of the plurality of layer amendment requests.

Example 24 is a method as in any of Examples 11-23, further comprising: extracting camera metadata from a camera that captured an input image of the space, wherein the base rendering of the space is generated based at least in part on the input image of the space; preprocessing the camera metadata; and providing a preprocessed version of the camera metadata to the AI/ML engine.

Example 25 is a method as in any of Examples 11-24, wherein determining the base rendering of the space comprises generating the base rendering of the space based on an input image, and wherein generating the base rendering of the space comprises: receiving the input image, wherein the input image is a two-dimensional drawing depicting the space, and wherein the input image comprises one or more lines; generating a bitmap based on the input image; performing edge detection on the bitmap to identify the one or more lines in the input image by applying a growth algorithm to pixels of the bitmap; and calculating a pixel width of each of the one or more lines in the input image.

Example 26 is a method as in any of Examples 11-25, wherein the base rendering of the space is a three-dimensional rendering of the space.

Example 27 is a method as in any of Examples 11-26, wherein the space is an outdoor space, and wherein the identified region associated with the layer comprises one or more of: a furniture object within the outdoor space; a lighting fixture within the outdoor space; a flooring region or ground region within the outdoor space; an appliance within the outdoor space; a recreational structure within the outdoor space; a plant within the outdoor space; or a décor object within the outdoor space.

Example 28 is a method as in any of Examples 11-27, further comprising generating a plurality of layers within the base rendering, wherein each of the plurality of layers is independently adjustable, and wherein each of the plurality of layers is associated with a unique identified region within the base rendering.

Example 29 is a method as in any of Examples 11-28, further comprising receiving a plurality of layer amendment requests from a user; wherein each of the plurality of layer amendment requests is applicable to one or more of the plurality of layers; wherein each of the plurality of layer amendment requests comprises one or more of a text prompt or an image prompt for adjusting a visual rendering of the applicable one or more of the plurality of layers; and wherein the AI/ML engine separately renders each of the plurality of layers based on the plurality of layer amendment requests to generate a customized layered rendering of the space that comprises each of the plurality of layers.

Example 30 is a method as in any of Examples 11-29, wherein providing the layer amendment request to the AI/ML engine comprises instructing the AI/ML engine to amend only the identified region within the base rendering based on the layer amendment request.

Example 31 is a system comprising one or more processors for executing instructions stored in non-transitory computer readable storage media, wherein the instructions comprise any of the method steps of Examples 1-30.

Example 32 is non-transitory computer readable storage media storing instructions for execution by one or more processors, wherein the instructions comprise any of the method steps of Examples 1-30.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member.

Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure.

What is claimed is:

1. A method comprising:
   determining a base rendering of a space;
   generating a layer within the base rendering, wherein the layer is associated with an identified region within the base rendering;
   receiving a layer amendment request comprising instructions for amending the identified region associated with the layer, wherein the layer amendment request comprises one or more of a text prompt or an image prompt; and
   providing the layer amendment request to an artificial intelligence and/or machine learning (AI/ML) engine configured to generatively render the identified region based on the layer amendment request.

2. The method of claim 1, further comprising receiving a customized layered rendering of the space from the AI/ML engine, wherein the customized layered rendering comprises the identified region rendered in accordance with the one or more of the text prompt or the image prompt.

3. The method of claim 1, wherein the layer amendment request comprises the text prompt;
   wherein the method further comprises preprocessing the text prompt; and
   wherein preprocessing the text prompt comprises one or more of filtering out a keyword within the text prompt, removing a stop word in the text prompt, executing a lemmatization technique on the text prompt, or encoding text within the text prompt.

4. The method of claim 3, wherein providing the layer amendment request to the AI/ML engine comprises providing a preprocessed version of the text prompt to the AI/ML engine.

5. The method of claim 1, wherein the layer amendment request comprises the image prompt;
   wherein the method further comprises preprocessing the image prompt; and
   wherein preprocessing the image prompt comprises one or more of padding, resizing, batching, cropping, or rotating the image prompt.

6. The method of claim 5, wherein providing the layer amendment request to the AI/ML engine comprises providing a preprocessed version of the image prompt to the AI/ML engine.

7. The method of claim 1, further comprising generating a plurality of layers within the base rendering, wherein each of the plurality of layers is associated with one or more identified regions within the base rendering.

8. The method of claim 1, wherein the identified region comprises an object of interest within the space, and wherein the method further comprises executing an object detection and data segmentation algorithm on the base rendering of the space to identify the identified region prior to generating the layer.

9. The method of claim 1, wherein the space is an interior space, and wherein the identified region associated with the layer comprises one or more of:

a furniture object within the interior space;

a lighting fixture within the interior space;

a wall space within the interior space;

a flooring region within the interior space;

an appliance within the interior space;

a cabinetry object within the interior space; or a décor object within the interior space.

10. The method of claim 9, wherein the layer amendment request comprises the text prompt comprising instructions to customize the identified region associated with the layer, and wherein the text prompt comprises one or more of:

text describing a desired furniture object to be rendered within the identified region;

text describing a desired lighting fixture to be rendered within the identified region;

text describing a desired wall covering to be rendered within the identified region;

text describing a desired floor covering to be rendered within the identified region;

text describing a desired appliance to be rendered within the identified region;

text describing one or more of a desired cabinetry configuration, desired cabinetry door front, desired cabinetry material, or desired cabinetry color to be rendered within the identified region; or text describing a desired décor object to be rendered within the identified region.

11. The method of claim 9, wherein the layer amendment request comprises the image prompt comprising an example image to be utilized to customize the identified region associated with the layer, and wherein the image prompt comprises one or more of:

an example image depicting a desired furniture object to be rendered within the identified region;

an example image depicting a desired lighting fixture to be rendered within the identified region;

an example image depicting a desired wall covering to be rendered within the identified region;

an example image depicting a desired floor covering to be rendered within the identified region;

an example image depicting a desired appliance to be rendered within the identified region;

an example image depicting one or more of a desired cabinetry configuration, desired cabinetry door front, desired cabinetry material, or desired cabinetry color to be rendered within the identified region; or an example image depicting a desired décor object to be rendered within the identified region.

12. The method of claim 1, wherein generating the layer within the base rendering comprises receiving a user input, and wherein the user input comprises one or more of:

a request to identify an object type within the base rendering, wherein the identified region comprises the object type; or a user-input selection of the identified region.

13. The method of claim 1, further comprising:

generating a plurality of layers within the base rendering, wherein each of the plurality of layers is associated with a unique identified region within the base rendering;

receiving a plurality of layer amendment requests, wherein each of the plurality of layer amendment requests is applicable to one or more of the plurality of layers;

providing each of the plurality of layer amendment requests to the AI/ML engine; and receiving from the AI/ML engine a customized layered rendering of the space, wherein the customized layered rendering is responsive to each of the plurality of layer amendment requests.

14. The method of claim 1, further comprising:

extracting camera metadata from a camera that captured an input image of the space, wherein the base rendering of the space is generated based at least in part on the input image of the space;

preprocessing the camera metadata; and providing a preprocessed version of the camera metadata to the AI/ML engine.

15. The method of claim 1, wherein determining the base rendering of the space comprises generating the base rendering of the space based on an input image, and wherein generating the base rendering of the space comprises:

receiving the input image, wherein the input image is a two-dimensional drawing depicting the space, and wherein the input image comprises one or more lines;

generating a bitmap based on the input image;

performing edge detection on the bitmap to identify the one or more lines in the input image by applying a growth algorithm to pixels of the bitmap; and calculating a pixel width of each of the one or more lines in the input image.

16. The method of claim 1, wherein the base rendering of the space is a three-dimensional rendering of the space.

17. The method of claim 1, wherein the space is an outdoor space, and wherein the identified region associated with the layer comprises one or more of:

a furniture object within the outdoor space;

a lighting fixture within the outdoor space;

a flooring region or ground region within the outdoor space;

an appliance within the outdoor space;

a recreational structure within the outdoor space;

a plant within the outdoor space; or a décor object within the outdoor space.

18. The method of claim 1, further comprising generating a plurality of layers within the base rendering, wherein each of the plurality of layers is independently adjustable, and wherein each of the plurality of layers is associated with a unique identified region within the base rendering.

19. The method of claim 18, further comprising receiving a plurality of layer amendment requests from a user;

wherein each of the plurality of layer amendment requests is applicable to one or more of the plurality of layers;

wherein each of the plurality of layer amendment requests comprises one or more of a text prompt or an image prompt for adjusting a visual rendering of the applicable one or more of the plurality of layers; and wherein the AI/ML engine separately renders each of the plurality of layers based on the plurality of layer amendment requests to generate a customized layered rendering of the space that comprises each of the plurality of layers.

20. The method of claim 1, wherein providing the layer amendment request to the AI/ML engine comprises instructing the AI/ML engine to amend only the identified region within the base rendering based on the layer amendment request.

\* \* \* \* \*